Patented Feb. 20, 1940

2,190,917

UNITED STATES PATENT OFFICE 2,190,917

ETHYLENE DICINNAMATE

Edgar C. Britton and Clarence L. Moyle, Midland, Mich., assignors to The Dow Chemical Company, Midland, Mich., a corporation of Michigan No Drawing. Application April 7, 1938, Serial No. 200,671

1 Claim. (Cl. 260—476)

This invention concerns the cinnamic acid diester of ethylene glycol, hereinafter referred to as "ethylene dicinnamate". Ethylene dicinnamate is a new unsaturated ester having the formula:

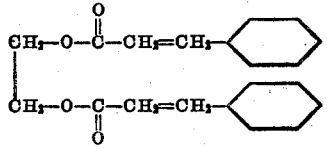

It is a white crystalline solid, insoluble in water but soluble in organic solvents such as benzene, chloroform, ethanol, etc. It is useful as an intermediate in the preparation of other organic chemicals and as a modifying agent in the preparation of polyvinyl type resins, particularly polystyrene.

Ethylene dicinnamate may be prepared by reacting ethylene glycol with cinnamic acid in the presence of an esterification catalyst, e. g. sulphuric acid, benzene sulphonic acid, etc. It may also be prepared by reacting ethylene glycol with cinnamyl chloride.

In preparing ethylene dicinnamate by esterifying ethylene glycol with cinnamic acid we prefer to carry out the reaction by heating to a temperature of approximately 60°–150° C. a mixture of ethylene glycol and approximately two molecular equivalents of cinnamic acid, together with a small proportion, e. g., 0.01–0.04 molecular equivalent, of catalyst. If desired, a water-immiscible solvent, such as benzene, methylene chloride, ethylene dichloride, etc., may be added for the purpose of promoting distillation and removal of the water formed during the reaction. The reaction is usually complete in from 8 to 20 hours, after which the reaction mixture is cooled to crystallize the ester product, and the latter separated and purified by recrystallization from a suitable solvent, e. g., ethanol.

As alternative procedure, we may prepare ethylene dicinnamate by heating a mixture of ethylene glycol and approximately two molecular equivalents of cinnamyl chloride at reflux temperature for 0.5–4.0 hours. The mixture is then cooled and ethylene dicinnamate separated by crystallization of the mixture from ethanol or by fractional distillation.

The following examples illustrate certain ways in which the principle of the invention has been applied, but are not to be construed as limiting the same:

Example 1

A mixture of 62 grams (1 mol) of ethylene glycol, 296 grams (2 mols) of cinnamic acid, and 1 gram of concentrated sulphuric acid was heated at 96°–101° C. for 20 hours in a flask fitted with a dropping funnel and a condenser and receiver arranged in such a manner as to permit distillation of water from the mixture. During the heating, 300 grams of ethylene dichloride was added to facilitate the distillation of water. 36 cc. of water was removed in this manner. After completion of the reaction the mixture was cooled, whereupon the ester product crystallized. The crystals were filtered off, washed with diethyl ether, and recrystallized from ethyl alcohol. The ethylene dicinnamate product was a white crystalline solid, having a melting point of approximately 89.5° C.

Example 2

90 grams (1.5 mols) of ethylene glycol was gradually added to 504 grams (3.0 mols) of cinnamyl chloride at a temperature of 40° C. The temperature was then gradually raised to 85° C. and the mixture heated under reflux for 45 minutes, during which time hydrogen chloride was evolved. Upon completion of the reaction, the mixture was fractionally distilled under reduced pressure. The fraction distilling at temperatures between 170° and 180° C. under 9 millimeters pressure was ethylene dicinnamate. This fraction solidified on cooling to the white crystalline product described in Example 1.

Other modes of applying the principle of our invention may be employed instead of those explained, change being made as regards the materials employed, provided the product stated by the following claim be obtained.

We therefore particularly point out and distinctly claim as our invention:

Ethylene dicinnamate, a white crystalline solid having a melting point of approximately 89.5° C. and having the formula:

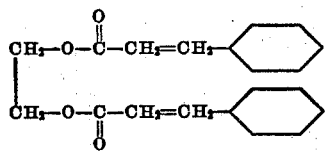

EDGAR C. BRITTON.
CLARENCE L. MOYLE.